United States Patent Office 2,958,532
Patented Nov. 1, 1960

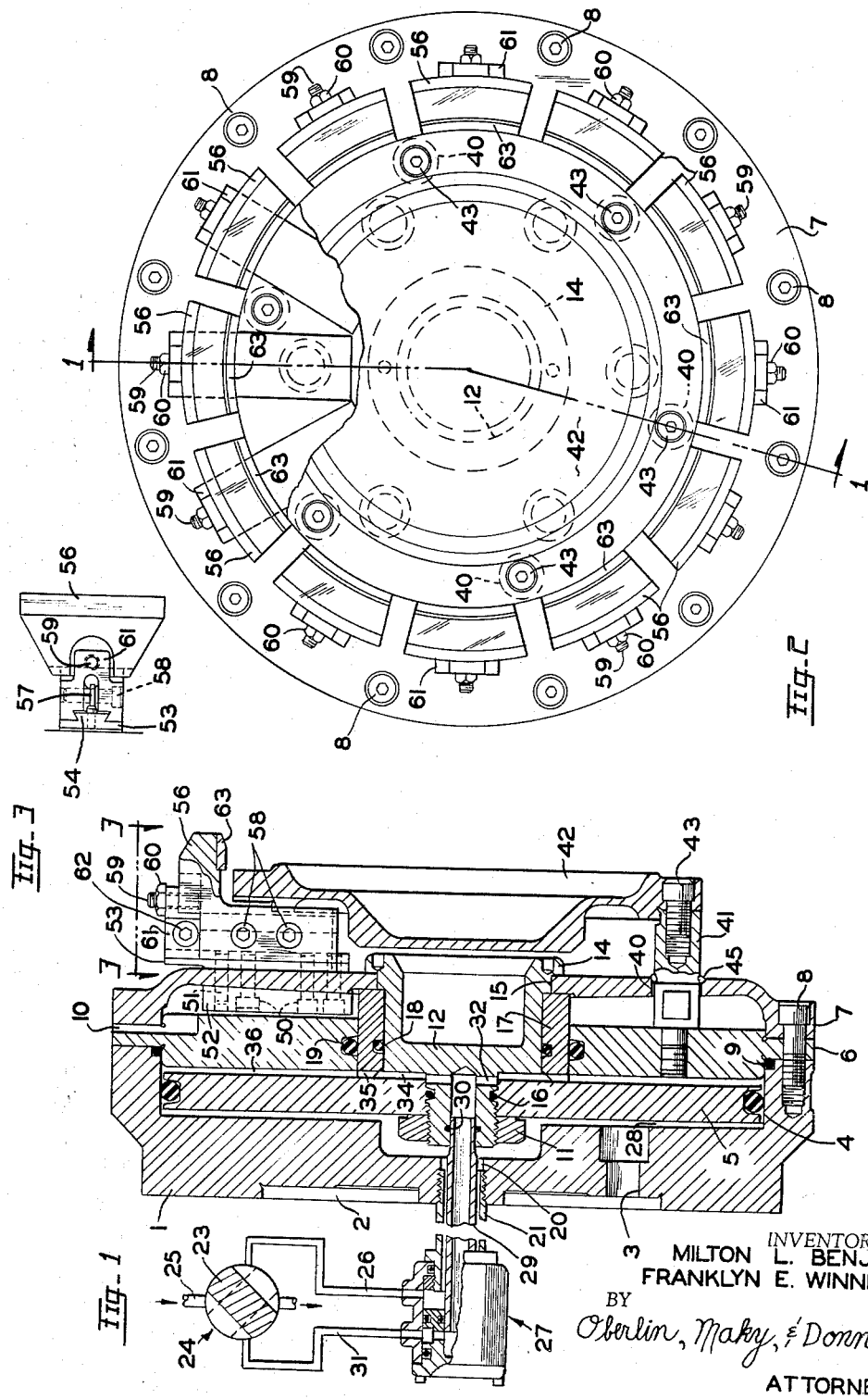

2,958,532

DOUBLE ACTING DIAPHRAGM CHUCK

Milton L. Benjamin, Shaker Heights, and Franklyn E. Winnen, Cleveland, Ohio, assignors to Erickson Tool Company, Solon, Ohio, a corporation of Ohio Filed Feb. 13, 1959, Ser. No. 793,148

5 Claims. (Cl. 279—4)

The present invention relates generally as indicated to a double acting diaphragm chuck and more particularly to such chuck in which a double acting piston and cylinder assembly is embodied in the chuck head itself, the piston being arranged so that when actuated by fluid pressure in one direction, it engages the diaphragm and resiliently flexes the latter to release the chuck jaws mounted thereon from the work and when actuated by fluid under pressure in the opposite direction, it flexes the diaphragm to cause the chuck jaws to grip the next workpiece with great force, including not only the force due to the natural tendency of the diaphragm returning to its initial unflexed condition, but additionally, the force due to the fluid pressure acting on the piston to move it in such opposite direction.

It is, of course, known to provide piston-actuated diaphragm chucks but, to our knowledge, these have always been of the single-acting type in which fluid under pressure acting on one side of the piston thereof flexes the diaphragm to open the chuck and, of course, when the fluid pressure is released, a workpiece is gripped in the chuck due to the tendency of the diaphragm coming back to its normal unflexed condition. One disadvantage of the known type of single-acting diaphragm chuck is that when the workpiece is to be subjected to heavy machining operations, the strength of the grip of the workpiece is limited by the flexibility of the diaphragm, especially in cases where the external surface of the workpiece is somewhat undersize, or where the internal surface of the workpiece is oversize. In those cases, the actuation of the piston flexes the diaphragm so that the chuck jaws have more than the normal amount of clearance with the surface (external or internal) of the workpiece to be gripped and, therefore, when the fluid pressure on the piston is released, the diaphragm starts to return to unflexed condition, but does not actually contact the workpiece until it has nearly reached its normal unflexed condition. Thus, the grip between the diaphragm chuck jaws and the workpiece may not be sufficient to permit the performance of the desired heavy machining operations. To remedy that situation, it has been proposed to employ a larger diameter piston or a greater fluid pressure in combination with a stronger diaphragm, but, obviously, this greatly adds to the cost of the chuck. An alternative, which is expensive and time-consuming, is to readjust the chuck jaws so that when the chuck is flexed, the surface of the workpiece which is to be gripped has a close slip-fit over or within the jaws. However, even in that case the maximum gripping force would only be equivalent to the unit fluid pressure multiplied by the cross-section area of the piston.

With the foregoing in mind, it is a principal object of this invention to provide a double-acting diaphragm chuck which enables the strong gripping of workpieces without increasing the fluid pressure, without increasing the cross-section area of the piston, and without using a stronger or stiffer diaphragm.

It is another object of this invention to provide a double-acting or push-pull piston actuated diaphragm chuck assembly which, despite its small size, is capable of gripping workpieces with at least twice the gripping force while yet preserving compactness of structure and economy of manufacture.

It is another object of this invention to provide a novel arrangement of a push-pull diaphragm chuck which has fixed stops for engagement by the work while providing a novel type of seal at the zone where the fixed stop extends through the flexible diaphragm.

Yet another object is to provide a novel combination of a push-pull diaphragm chuck with a double rotary coupling and a four-way reversing valve whereby fluid under pressure may be selectively admitted through concentric pipes into the cylinder to act on either side of the piston therein.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

In said annexed drawing:

Fig. 1 is a transverse cross-section view taken substantially diametrically through the diaphragm chuck as indicated by the line 1—1, Fig. 2, and schematically showing the double rotary coupling and the four-way valve;

Fig. 2 is a front elevation view of the chuck as viewed from the right-hand side of Fig. 1, a portion of the stop plate being broken away to show the inner portions of the adjustable workpiece gripping jaws; and Fig. 3 is a top plan view as viewed along the line 3—3, Fig. 1, showing one of the adjustable jaw assemblies.

Referring now more particularly to the drawing, the reference numeral 1 denotes a circular mounting plate which is formed with a recess 2 in its rear face for mounting on a machine tool spindle or the like, as by means of bolts, not shown, passing through the several holes 3 formed in said plate. The front face of the mounting plate is recessed to provide a cylinder 4 in which the piston 5 is mounted for axial reciprocation. Secured to the front of the mounting plate is a rigid backup plate 6 and a flexible diaphragm 7, the backup plate 6 and diaphragm 7 being secured to the mounting plate 1 as by the circular series of screws 8 which have threaded engagement in holes formed in the mounting plate 1. The joint between the mounting plate 1 and the backup plate 6 is sealed as by means of the O-ring 9 and the outer peripheral portion of the backup plate 6 is formed with radiating notches 10 to permit draining of foreign matter which may get in between the backup plate 6 and the diaphragm 7 and, of course, when the chuck is rotating such foreign matter will be thrown out by centrifugal force.

The piston 5 has secured thereto by the nut 11 a diaphragm actuator 12 which, at its front end, is formed with a radially extending flange 14 that radially overlies the margin of the central opening 15 formed in the diaphragm 7. Thus, as hereinafter explained, when the piston 5 is moved toward the left, as viewed in Fig. 1, the actuator 12 will cause the central portion of the diaphragm 7 to be flexed rearward or to the left, with respect to the peripheral portion thereof. The joint between the actuator 12 and the piston 5 is sealed as by means of the O-ring 16.

Surrounding the actuator 12 and extending between the piston 5 and the inside or rear face of the diaphragm 7, is an actuator sleeve 17 which, as shown, radially overlies the rear face of the margin of the central opening 15 in the diaphragm 7. Thus, when the piston is moved to the right, as viewed in Fig. 1, it will urge the sleeve 17 forwardly to the right to flex the central portion of the diaphragm 7 forwardly with respect to the peripheral portion thereof. The sleeve 17 has sealed engagement with the actuator 12 and with the backup plate 6 through the O-rings 18 and 19.

For actuating the piston in forward direction the mounting plate 1 is formed with a central threaded inlet port 20 into which the pipe 21 is screwed, whereby, when the valve member 23 of the four-way reversing valve 24 is moved to the dotted line position, air under pressure will flow from supply line 25, through line 26, through the double rotary coupling 27, and through pipe 21 into the chamber 28 to the rear or left side of piston 5. For actuating the piston in the opposite direction, that is, toward the rear or left, as viewed in Fig. 1, there is provided an inner pipe 29 which extends into a passage formed in the shank of the actuator 12 and the joint between the inner pipe 29 and the shank is sealed as by means of the O-ring 30. When the valve member 23 is in the position shown in full lines, air under pressure flows through the conduit 31, through coupling 27, through pipe 29, and through radiating passages 32 and channels 34 and 35 formed on the inner faces of actuator 12 and sleeve 17 into chamber 36 and thus acts on the front or right face of the piston to force the same to the left or rear, as viewed in Fig. 1.

The rear ends of the outer and inner pipes 21 and 29 will be connected to the double rotary coupling 27 as shown so that the chuck and spindle may rotate with respect to the body of the coupling 27.

The diaphragm 7 herein is shown formed with several circularly arranged openings 40 through which extend the stop screws 41 that are threaded into the fixed backup plate 6, and in this particular case a stop plate 42 for the workpiece is mounted on the stop screws 41 by screws 43. The stop screws 41 where they extend through the diaphragm openings 40 are sealed as by means of O-rings 45 which are disposed in grooves formed in the stop screws 41 and engage countersunk surfaces of such openings to permit flexing of the diaphragm 7 while precluding chips and coolant from gaining access into the space between the backup plate 6 and the diaphragm 7.

Secured by means of screws 50 and dowel pins 51, to the diaphragm 7 are clamp plates 52 and jaw bases 53 in radially extending relation as shown, and in the particular example herein, there are twelve such jaw bases 53 uniformly spaced around the diaphragm 7. Each jaw base is formed with a radially extending dovetail tongue 54 and engaged therewith is a jaw member 56 which has a complementary dovetail groove. In this case, each jaw 56 is slotted, as shown at 57, and is clamped in adjusted position by the clamp screws 58 which are operative to contract the jaw 56 so that its dovetail groove tightly engages the dovetail tongue 54 formed on the associated jaw base 53. Each jaw base 53 is also provided with an adjusting screw 59 and lock nut 60 so that the jaw 53 may be accurately adjusted and be backed up by said screw 59. Each screw 59 has threaded engagement with a stop block 61 that is secured on jaw base 53 by screw 62.

In the example here shown, each jaw 56 has a work-engaging pad 63 secured thereto arranged to grip the exterior surface of a workpiece.

In operation, air under pressure is first admitted into the outer pipe 21 as previously explained, whereupon it acts on the rear side of the piston 5 to move the latter forwardly and through the sleeve 17, flex the central portion of the diaphragm 7 outwardly, this causing the jaw pads 63 to swing outwardly so that a workpiece may be inserted therewithin and engaged against the stop plate 42. At this time the chamber 36 is vented through pipe 29, coupling 27 and valve 24. When the air pressure in the outer pipe 21 is released through coupling 21 and valve 24, the diaphragm 7 will tend to return to its normal unflexed condition, whereby the jaws 56 swing inwardly to grip the workpiece. At the same time, when air under pressure is admitted through the inner pipe 29 it will act on the front face of the piston 5 and will thereby move the piston 5 toward the left, or rearward, and such movement of the piston 5 will, through the actuator 12, forcefully draw the central portion of the diaphragm rearward to the left tending to further swing the jaws 56 inwardly into very firm gripping engagement with the workpiece. Thus, without increasing the diameter of the piston 5, without increasing the air pressure, and without using a more rugged diaphragm, the gripping force of the jaws 56 on the workpiece will be doubled.

Other modes of applying the principle of the invention may be employed, change being made as regards the details described, provided the features stated in any of the following claims, or the equivalent of such, be employed.

We therefore particularly point out and distinctly claim as our invention:

1. In a double acting diaphragm chuck assembly, the combination of a mounting plate, a backup plate, and a diaphragm peripherally secured together, said mounting plate and said backup plate defining a cylindrical chamber therebetween, and said diaphragm having a laterally flexible center portion; a piston axially movable in such chamber; workpiece gripping jaws mounted on such center portion of said diaphragm for relative radial movement upon flexing of such center portion; an actuator connected to such center portion and to said piston so that when said piston is moved in one direction under the influence of fluid under pressure acting on one side thereof said diaphragm is flexed in one direction for moving said jaws to receive a workpiece, and so that when said piston is moved in the other direction under the influence of fluid under pressure acting on the other side thereof said flexed diaphragm is pulled back toward its normal unflexed condition for moving said jaws to grip such workpiece with a force which is the result of the normal tendency of the diaphragm to return to its unflexed condition plus that due to the force exerted on said diaphragm by said piston; fluid pressure supply means selectively operable to conduct fluid under pressure into the opposite end portions of such chamber to act on and move said piston in one direction or the other, stop members secured to said backup plate axially to project through openings formed in said diaphragm, and elastic rings carried by said stop members to seal such diaphragm opening while permitting flexing of said diaphragm.

2. In a double acting diaphragm chuck assembly, the combination of a mounting plate, a backup plate, and a diaphragm peripherally secured together, said mounting plate and said backup plate defining a cylindrical chamber therebetween, and said diaphragm having a laterally flexible center portion; a piston axially movable in such chamber, workpiece gripping jaws mounted on such center portion of said diaphragm for relative radial movement upon flexing of such center portion; an actuator connected to such center portion and to said piston so that when said piston is moved in one direction under the influence of fluid under pressure acting on one side thereof said diaphragm is flexed in one direction for moving said jaws to receive a workpiece, and so that when said piston is moved in the other direction under the influence of fluid under pressure acting on the other side thereof said flexed diaphragm is pulled back toward its normal unflexed condition for moving said jaws to grip such workpiece with a force which is the result of the normal tendency of the diaphragm to return to its unflexed condition plus that due to the force exerted on said diaphragm by said piston; fluid pressure supply means selectively operable to conduct fluid under pressure into the opposite end portions of such chamber to act on and move said piston in one direction or the other, said actuator comprising an inner cup-shaped member secured at the center of said piston to project axially through said backup plate and said diaphragm, and a sleeve member around said cup-shaped member disposed in abutting engagement between said piston and one side of said diaphragm and extending through said backup plate in sealed, sliding engagement therewith, thus to transmit force from said piston to said diaphragm in one direction, said cup-shaped member being formed with a radially extending flange which engages the other side of said diaphragm to transmit force from said piston to said diaphragm in the other direction.

3. The diaphragm chuck assembly of claim 2 characterized further in that said cup-shaped member and said sleeve member define with said piston radially extending passages leading to the end portion of such chamber disposed on one side of said piston.

4. The diaphragm chuck assembly of claim 3 characterized further in that said fluid pressure supply means includes a pair of concentric pipes of which the inner pipe at one end communicates with such radially extending passages and of which the outer pipe at one end communicates with a passage in said mounting plate which leads to the end portion of such chamber disposed on the other side of said piston.

5. The diaphragm chuck assembly of claim 4 characterized further in that said concentric pipes at their other ends are connected to a rotary coupling, and in that a four-way valve adapted for connection with a fluid pressure source is operatively connected with said coupling to selectively cause fluid under pressure to flow through one or the other of said pipes and thus to move said piston in one direction or the other.

References Cited in the file of this patent
UNITED STATES PATENTS

| | | |
|---|---|---|
| 2,464,507 | Hohwart et al. | Mar. 15, 1949 |
| 2,821,400 | Hohwart et al. | Jan. 28, 1958 |
| 2,832,601 | Mann | Apr. 29, 1958 |